(12) United States Patent
Müller et al.

(10) Patent No.: US 11,743,602 B2
(45) Date of Patent: Aug. 29, 2023

(54) CAMERA AND METHOD FOR DETECTING OBJECTS MOVED THROUGH A DETECTION ZONE

(71) Applicant: SICK AG, Waldkirch (DE)

(72) Inventors: Romain Müller, Waldkirch (DE); Dirk Strohmeier, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 17/833,281

(22) Filed: Jun. 6, 2022

(65) Prior Publication Data

US 2022/0394185 A1    Dec. 8, 2022

(30) Foreign Application Priority Data

Jun. 7, 2021 (DE) .......................... 102021114556.2

(51) Int. Cl.
*H04N 23/959* (2023.01)
*H04N 23/67* (2023.01)

(52) U.S. Cl.
CPC ......... *H04N 23/959* (2023.01); *H04N 23/671* (2023.01)

(58) Field of Classification Search
CPC .... H04N 23/959; H04N 23/671; H04N 23/61; H04N 23/75; G03B 9/02; G03B 13/20; G03B 13/32; G03B 7/006; G06V 30/1437; G06V 30/424
See application file for complete search history.

(56) References Cited

U.S. PATENT DOCUMENTS

| | | |
|---|---|---|
| 7,025,271 B2 | 4/2006 | Dvorkis et al. |
| 9,936,119 B2 | 4/2018 | Salvi et al. |
| 2010/0310246 A1 | 12/2010 | Campbell |
| 2012/0229674 A1 | 9/2012 | Solomon |
| 2017/0310867 A1 | 10/2017 | Tsukamoto |

FOREIGN PATENT DOCUMENTS

| | | |
|---|---|---|
| DE | 19710724 A1 | 9/1998 |
| DE | 202009017346 U1 | 5/2011 |
| DE | 102018105301 A1 | 9/2019 |
| DE | 102020109928 B3 | 12/2020 |
| DE | 102020109929 B3 | 1/2021 |
| JP | 2008-233470 A | 10/2008 |
| JP | 2008312144 A | 12/2008 |
| JP | 2011-151448 A | 8/2011 |
| JP | 2018-136860 A | 8/2018 |
| JP | 2021-77360 A | 5/2021 |

OTHER PUBLICATIONS

DE 102020109928 Translation (Year 2020) (Year: 2020).*
Srinivasan, et al., "Aperture Supervision for Monocular Depth Estimation", IEEE Computer Society, 2018 IEEE/CVF Conference on Computer Vision and Pattern Recognition, pp. 6393-6401.

* cited by examiner

*Primary Examiner* — Twyler L Haskins
*Assistant Examiner* — Angel L Garces-Rivera
(74) *Attorney, Agent, or Firm* — Nath, Goldberg & Meyer; Jerald L. Meyer

(57) ABSTRACT

A camera (10) is provided for the detection of objects (48) moved through a detection zone that has an image sensor (18) for recording image data, a reception optics (16) having an adjustable diaphragm (17), and a control and evaluation unit (38) to read the image data and to set the diaphragm (17), In this respect, the control and evaluation unit (38) is furthermore configured to set the diaphragm (17) per object (48) such that the object (48) is recorded in a depth of field range.

17 Claims, 2 Drawing Sheets

CAMERA AND METHOD FOR DETECTING OBJECTS MOVED THROUGH A DETECTION ZONE

Figure 1:
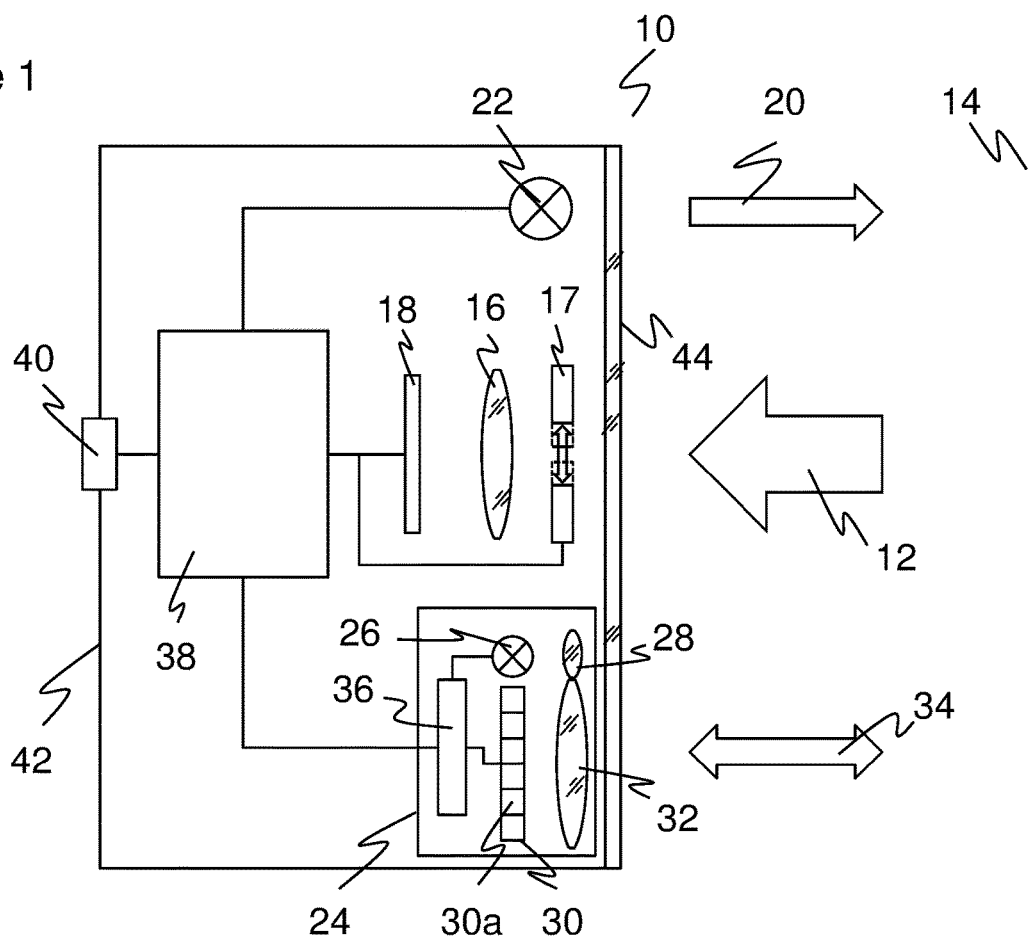

The invention relates to a camera and to a method for detecting objects moved through a detection zone.

Cameras are used in a variety of ways in industrial applications to automatically detect object properties, for example for the inspection or for the measurement of objects. In this respect, images of the object are recorded and are evaluated in accordance with the task by image processing methods. A further use of cameras is the reading of codes. Objects with the codes located thereon are recorded using an image sensor and the code regions are identified in the images and then decoded. Camera-based code readers also cope without problem with different code types than one-dimensional barcodes which also have a two-dimensional structure like a matrix code and provide more information. The automatic detection of the text of printed addresses, (optical character recognition, OCR) or of handwriting is also a reading of codes in principle. Typical areas of use of code readers are supermarket cash registers, automatic parcel identification, sorting of mail shipments, baggage handling at airports, and other logistic applications.

A frequent detection situation is the installation of the camera above a conveyor belt. The camera records images during the relative movement of the object stream on the conveyor belt and instigates further processing steps in dependence on the object properties acquired. Such processing steps comprise, for example, the further processing adapted to the specific object at a machine which acts on the conveyed objects or a change to the object stream in that specific objects are expelled from the object stream within the framework of a quality control or the object stream is sorted into a plurality of partial object streams. If the camera is a camera-based code reader, the objects are identified with reference to the affixed codes for a correct sorting or for similar processing steps.

The camera is frequently a part of a complex sensor system. It is, for example, customary in reading tunnels on conveyor belts to install a plurality of camera-based code readers next to one another, on the one hand, to cover a larger conveyor belt width and, on the other hand, to install them from different perspectives to record objects from a plurality of sides. The geometry of the conveyed objects is furthermore frequently measured in advance using a separate laser scanner to determine focus information, trigger times, image zones with objects and the like from it.

A diaphragm is typically installed in the objective of the camera. The aperture, however, conventionally remains constant in the described applications. An adaptation of the aperture to find a suitable constant aperture for the operation possibly only takes place once, for example during the installation process.

Adjustable diaphragms have long been in use in the field of photography. In the meantime, there have been a variety of technical implementations for variable diaphragms. A classical iris diaphragm can be actuated by a motor. An LCD display having discrete pixels that can be switched from opaque to transparent enables a diaphragm effect with different aperture radii. Alternatively to an LCD display, the use of microfluids is conceivable, wherein an opaque liquid is actuated via electrowetting in order thus to be positioned in annular form on a transparent screen at different discrete radii. A further implementation option is based on a transparent membrane that arches inwardly due to vacuum and displaces an opaque liquid. A round transparent opening is thereby produced on the contact surface of the membrane and the glass substrate.

A distance sensor that is based on a time of flight (TOF) process is integrated in a camera in DE 10 2018 105 301 A1. A height profile is thus measured and different functions are implemented with reference thereto. One of these functions is the setting of the focal position of a reception optics. A diaphragm in the reception objective is only mentioned once and this diaphragm is not adjustable.

The measurement duration of such a distance sensor is adapted in DE 10 2020 109 928 B3 so that the distance value is measured at most with a measurement error at which the correspondingly selected focal position is sufficient for a required image definition. DE 10 2020 109 929 B3 only adjusts to a focal position of still sufficient image definition with too short an available focusing time up to a fixed position that can be reached in good tome, said image definition differing from the optimum focal position corresponding to the distance measurement. The influence of the diaphragm on the depth of field range should here respectively be explicitly precluded by fixing or by optimum adjustment.

U.S. Pat. No. 7,025,271 B2 describes a camera based code reader having a selectable depth of field range that is preferably configured as a hand-held device. An optical element is switched over between a transmissive and a reflective state to thus guide the received light to a first or second lens arrangement, with the lens arrangements having different depth of field ranges among one another. An adjustable diaphragm arrangement is mentioned in the introduction and it is noted that the depth of field range becomes larger with a smaller diaphragm diameter and vice versa. This is, however, then not explored in more detail.

US 2010/0310246 A1 deals with the aperture selection in photography. The aperture is selectively set manually or automatically to avoid overexposure or underexposure. US 2012/0229674 A1 makes use of a database to perform an algorithm to optimize the depth of field range. In this respect, the depth of field range can be modified by a change of the aperture.

It is therefore the object of the invention to further improve the recording of images.

This object is satisfied by a camera and by a method for detecting objects moved through a detection zone in accordance with the respective independent claim. The camera and the objects are in relative motion with respect to one another and the objects to be recorded thereby move into or through the detection zone of the camera. An image sensor records images or image data of the detection zone and thus of an object located there. A reception optics of the camera designates a reception objective that, in dependence on the quality demands, has one or more elements and other optical elements and an adjustable diaphragm whose diaphragm aperture is variable by control. The depth of field range results from properties of the reception optics and the respective setting of the diaphragm. A control and evaluation unit reads the image data to, for example, preprocess, evaluate, or store them or to output them to an interface. It is furthermore responsible for the control of the diaphragm and thus for its suitable setting. The control and evaluation unit can have a common module or respective separate modules that takes/take care of the diaphragm setting, on the one hand, and the other tasks of the camera such as the processing of the image data, on the other hand.

The invention starts from the basic idea of dynamically adapting the diaphragm setting from object to object. It is ensured for every object by a suitable diaphragm that it is recorded within a depth of field range and the recorded image or the image data thus achieves/achieve a required depth of field.

The invention has the advantage that the quality of the image data is increased by the individual adaptation of the diaphragm per object. This enables a simpler design of the reception optics at a different point, for example a fixed focus system, or it alternatively satisfies particularly high demands on the image data.

An adjustable diaphragm is available as a component and the invention can therefore be implemented simply and comparatively inexpensively.

The depth of field range is preferably determined from application-specific demands. The term depth of field range is thus explicitly used in a further understanding than in its original optical or physical sense. The physical depth of field range depends on objective constants and objective settings of the reception optics. It is here not primarily pure depth of field criteria that are important in practice, but rather the question whether the image data will permit the desired evaluation. This may have to be evaluated very differently from application to application. The diaphragm setting should preferably take care that the object is recorded in a depth of field range in accordance with this application-related understanding.

The control and evaluation unit is preferably configured to read a code content of a code on the object using the image data. The camera thus becomes a camera-based code reader for barcodes and/or 2D codes according to various standards, optionally also for text recognition (optical character recognition, OCR). Before a code is read, a segmentation is even more preferably carried out by which regions of interest (ROIs) are identified as code candidates.

The object is preferably then recorded in the depth of field range when a code can be read from the recorded image data. This is an example of the above-addressed application-specific demands on the depth of field range. The image should be recorded so sharp that a code can be read. This is a purely practice-related criterion in which it is not the abstract quality or image distinction degrees of the image data that is important, but rather purely pragmatically the question whether the object of code reading can be satisfied. A maximum decoding or reading rate is thus achieved by a dynamic adaptation of the diaphragm. The expectation of when the image definition is sufficient to read a code can be simulated in advance or can be generated by experiment. For this purpose, codes are, for example, presented to the camera under typical conditions, for example with regard to environmental light and print quality, at different distances to determine the diaphragm settings at which a code is still read (GoodRead) or the focus deviation from which the code is no longer read (Noread).

The required depth of field range preferably depends on a code type, a module size, for example indicated in pixels per module, and/or on a decoding process. It is again here not the physical depth of field range alone that is important, but rather practical demands and thus the further understanding of an application-specific depth of field range. Whether a code can be read is in particular determined in dependence on said parameters or settings. Some code types are simpler and can thus also be read from comparatively low-quality image data; conversely, some code types are particularly demanding. If more pixels per module are available, the code reading is simpler than with a small module size. The exposure, both in the sense of integration time and of illumination scenario of an optical active illumination, plays its role. Some decoders cope with smaller image quality better than others. In this respect, there can be interactions between said parameters that have an effect on the required depth of field range.

The camera preferably has a distance sensor for measuring a distance value from an object. The distance value preferably serves as a criterion for a required depth of field range and the control and evaluation unit can set the diaphragm accordingly. In a preferred static installation of the camera above a reference plane, for example a conveyor belt, the distance value can be converted into a height of the object above this reference place with knowledge of the installation position. The object height and the distance are therefore used replaceably at some points in the following.

The distance sensor is preferably integrated in the camera. The system thereby remains compact and encapsulated. The control and evaluation unit has simple internal access to the distance sensor. The distance sensor is preferably configured as an optoelectronic distance sensor, in particular in accordance with the principle of the time of flight process. Such distance sensors are available as completed chips or modules. The distance sensor particularly preferably has a plurality of SPADs (single photon avalanche photodiodes) that each measure a single time of flight via TDCs (time-to-digital converters).

The control and evaluation unit is preferably configured to set the diaphragm for an object in dependence on a distance value measured for the object. The dynamic coupling of the setting of the diaphragm to the distance value of the individual objects provides that the respective object is recorded within a required depth of field range, with the depth of field range preferably being understood in the application-specific sense discussed multiple times.

The control and evaluation unit preferably sets the diaphragm for an object using a function of the required diaphragm in dependence on the distance of an object. A function diaphragm(distance) or diaphragm(object height) is thus stored, for example in a memory of the camera or of the control and evaluation unit. This function can be predefined as an analytical function or as an approximation, for example as a step function, overall or piece by piece as a linear polynomial function, or as a lookup table (LUT).

The control and evaluation unit is preferably configured for a teaching process in which an object is arranged at a distance, image data are recorded, an image distinction is checked, and the diaphragm is adjusted until a suitable diaphragm setting for this distance has been found. The matching diaphragm for a specific distance can thus be calibrated or taught that should then be dynamically set in operation for an object at this distance. The criterion for the respective suitable diaphragm is, for example, a maximum, optimum, or still sufficient image distinction or an application-specific demand such as that a code is read. The teaching for at least one further object can be repeated at the same distance and then averaged, for example, for a more robust result. Further repetitions position an object or a plurality of objects after one another at different distances to locate the suitable diaphragm setting therefor or a plurality of values of the function diaphragm(distance) in a preferred embodiment. An interpolation can be used instead of the thus resulting step function.

The reception optics preferably has a fixed focal position. The camera thus forms a fixed focus system. The fixed focal position is preferably set to far objects, i.e. objects having a smaller height at a maximum object distance, for example in a plane of a conveyor belt. Codes on these objects are therefore recorded with a small module size. It is therefore sensible to select the focal position for this particularly demanding decoding task.

Alternatively, a focus adjustment unit is conceivable for setting a focal position, in particular an autofocus unit. The diaphragm can be completely opened in a first step to locate the respective focal position independently of a distance measurement. The depth of field range thereby becomes small and this makes it possible to locate a clear maximum of the contrast over the distance. A focal position set according to this maximum is therefore ideal. The diaphragm can then subsequently be closed again to expand the depth of field range.

The control and evaluation unit is preferably configured to set the diaphragm to a maximum diaphragm aperture for an object at a distance corresponding to the focal position and to increasingly close the diaphragm for different, in particular smaller, distances. If an object is located at a distance corresponding to the focal position, either the distance matching a fixed focus or an instantaneous setting of a focus adjustment, no contribution of the diaphragm to an expanded depth of field range is thus required. The maximum aperture of the diaphragm can still be restricted by other marginal conditions such as overexposures. The depth of field range can be expanded by closing the diaphragm at differing distances. This behavior can be mapped by the function diaphragm(distance). The focal position is preferably set to a maximum distance in a fixed focus system. For a far remote object, the diaphragm is then open, the depth of field range is small, and images are recorded with a lot of light at a good resolution. With a plurality of objects, the diaphragm is reduced in size and the depth of field range expands. The reduced light incidence is as a rule even desired due to the distance-dependent dynamic behavior, i.e. the typical $1/r^2$ characteristic. The worse resolution is acceptable since the structures and in particular the module sizes increase in size as the proximity increases.

The control and evaluation unit is preferably configured to set the diaphragm in dependence on a brightness, in particular of the image data. A remission measurement here becomes the basis of the diaphragm setting instead of a distance measurement. Under otherwise the same conditions, a near object will appear brighter than a far object. The remission measurement takes place by an additional light receiver, for example a photodiode or the like, or the brightness of the image data is evaluated for this purpose. A distance measurement and a remission measurement can also be combined.

The diaphragm is preferably installed in the reception optics or is placed onto the reception optics. The adjustable diaphragm can in particular replace the previous fixed diaphragm in an objective design. It is conceivable to form a diaphragm integrated together with a lens. Alternatively, the adjustable diaphragm is placed onto the objective at the front toward the scenery or at the rear toward the image sensor.

The camera is preferably installed in a stationary manner at a conveying device that leads objects to be detected in a conveying direction through the detection zone. This is a very frequent industrial application of a camera. The setting of the diaphragm practically has to be able to respond constantly and under tight time constraints due to the constantly changing objects and the strict specification of the object change through the conveying device.

The method in accordance with the invention can be further developed in a similar manner and shows similar advantages in so doing. Such advantageous features are described in an exemplary, but not exclusive manner in the subordinate claims dependent on the independent claims.

Figure 2:
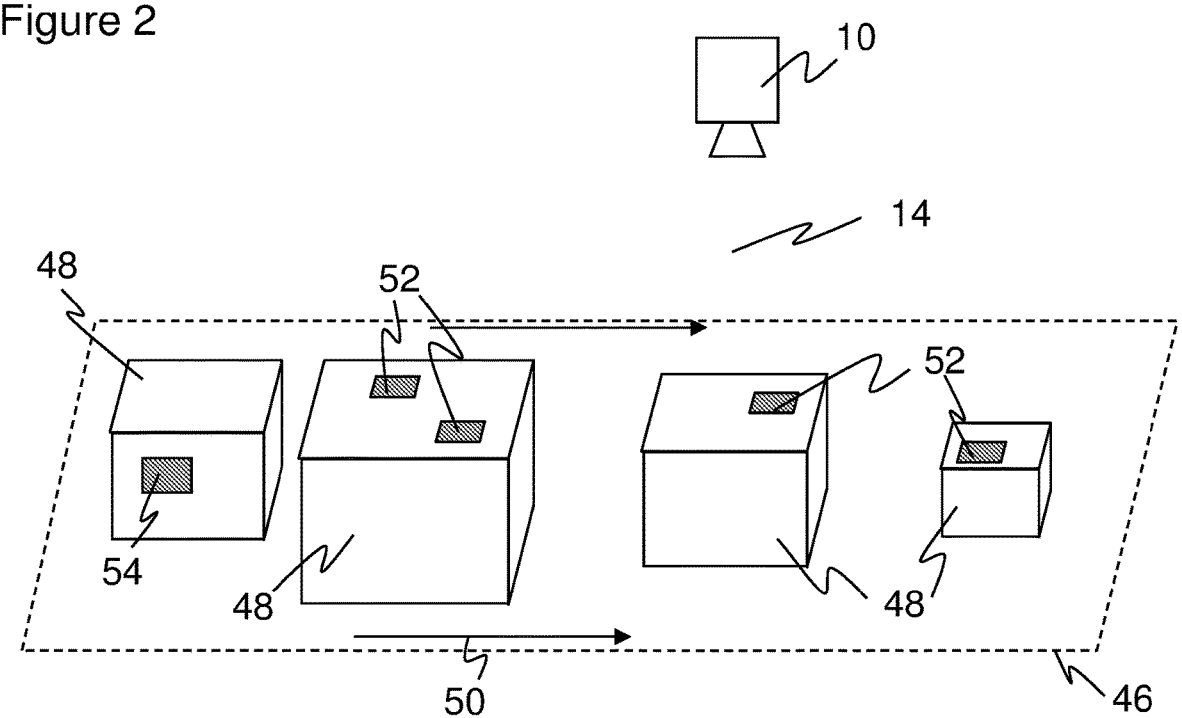
Figure 3:
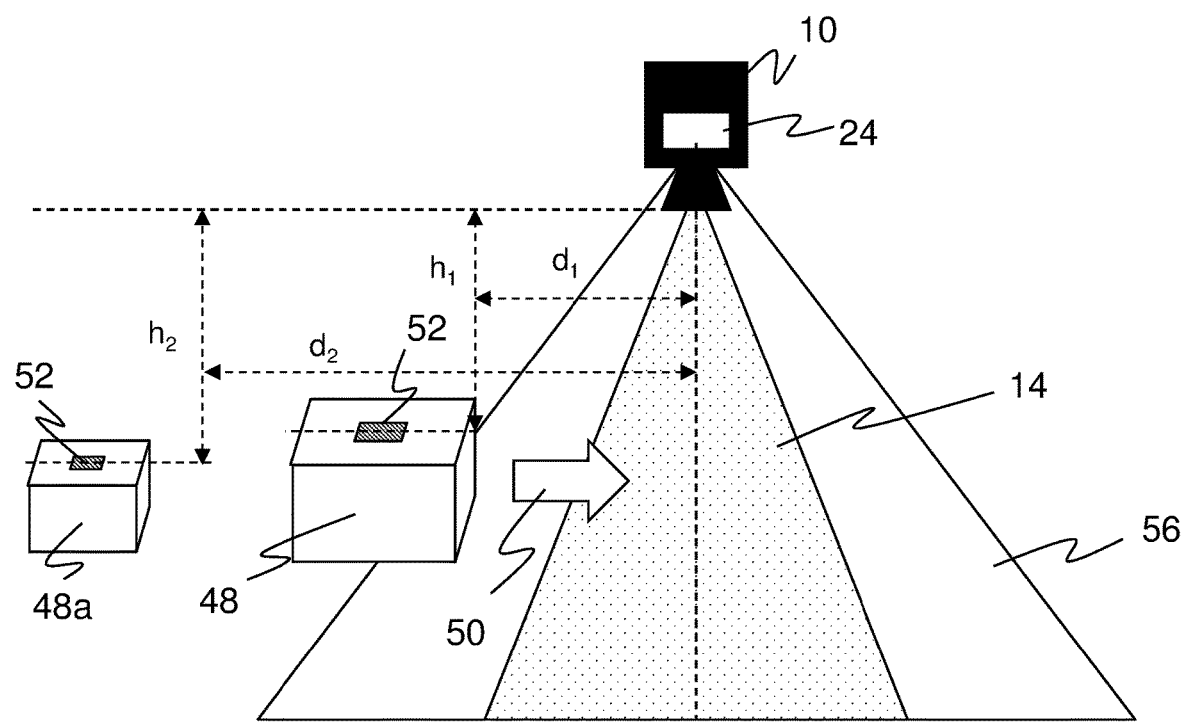

The invention will be explained in more detail in the following also with respect to further features and advantages by way of example with reference to embodiments and to the enclosed drawing. The Figures of the drawing show in:

FIG. 1 a schematic sectional representation of a camera;

FIG. 2 a three-dimensional view of an exemplary use of the camera in an installation at a conveyor belt; and FIG. 3 a representation of a camera and of two sequential objects that are moved in its detection zone to explain the geometric relationships and the time behavior at a conveyor belt.

FIG. 1 shows a schematic sectional representation of a camera 10. Received light 12 from a detection zone 14 is incident on a reception optics 16 that conducts the received light 12 to an image sensor 18. The optical elements of the reception optics 16 are preferably designed as an objective composed of a plurality of lenses and other optical elements such as diaphragms, prisms, and the like, but here only represented by a lens for reasons of simplicity. The reception optics 16 in a preferred embodiment has a fixed focal position (fixed focus); alternatively, the focal position is changed in operation (focus adjustment, autofocus).

An adjustable diaphragm 17 is associated with the reception optics. The adjustment principle can be based on the most varied technologies, in particular on an iris diaphragm actuated by a motor, on an LCD display, on an opaque liquid while utilizing the electrowetting effect, or on a transparent membrane as briefly discussed in the introduction. Only the functional aspect will be looked at in the following that the diaphragm aperture of the adjustable diaphragm 17 is variable by electronic control. The adjustable diaphragm can be installed in the reception optics 16 or be placed on toward the image sensor 18 or toward the detection zone 14. The adjustable diaphragm preferably produces a round diaphragm aperture, but other geometries are also conceivable.

To illustrate the detection zone 14 with transmitted light 20 during a recording of the camera 10, the camera 10 comprises an optional illumination unit 22 that is shown in FIG. 1 in the form of a simple light source and without a transmission optics. In other embodiments, a plurality of light sources such as LEDs or laser diodes are arranged around the reception path annularly, for example, and can also be multi-color and controllable in groups or individually to adapt parameters of the illumination unit 22 such as its color, intensity, and direction. The illumination unit 22 can be an external component or can be completely dispensed with in a manner differing from the representation and in the latter case the camera 10 only works with the environmental light.

In addition to the actual image sensor 18 for detecting image data, the camera 10 has an optoelectronic distance sensor 24 that measures distances from objects in the detection zone 14 using a time of flight (TOF) process. The distance sensor 24 comprises a TOF light transmitter 26 having a TOF transmission optics 28 and a TOF light receiver 30 having a TOF reception optics 32. A TOF light signal 34 is thus transmitted and received again. A time of flight measurement unit 36 determines the transit time of the TOF light signal 34 and determines from this the distance from an object at which the TOF light signal 34 was reflected back.

The TOF light receiver 30 in the embodiment shown has a plurality of light reception elements 30*a* or pixels and can thus even detect a spatially resolved height profile. Alternatively, the TOF light receiver 30 only has one light reception element 30a or offsets a plurality of measurement values of the light reception elements 30a to one distance value. The design of the distance sensor 24 is purely exemplary and other optoelectronic distance measurements without time of flight processes and non-optical distance measurements are also conceivable. The optoelectronic distance measurement by means of time light processes is known and will therefore not be explained in detail. Two exemplary measurement processes are photomixing detection using a periodically modulated TOF light signal 34 and pulse time of flight measurement using a pulse modulated TOF light signal 34. There are also highly integrated solutions here in which the TOF light receiver 30 is accommodated on a common chip with the time of flight measurement unit 36 or at least parts thereof, for instance TDCs (time-to-digital converters) for time of flight measurements. In particular a TOF light receiver 30 is suitable for this purpose that is designed as a matrix of SPAD (single photon avalanche diode) light reception elements 30a. For such a SPAD-based distance measurement, a plurality of light reception elements 30a are particularly advantageous that are not used for a spatially resolved measurement, but rather for a statistical multiple measurement with which a more exact distance value is determined. The TOF optics 28, 32 are shown only symbolically as respective individual lenses representative of any desired optics such as a microlens field.

A control and evaluation unit 38 is connected to the adjustable diaphragm 17, to the illumination unit 22, to the image sensor 18, and to the distance sensor 24 and is responsible for the control work, the evaluation work, and for other coordination work in the camera 10. It therefore controls the adjustable diaphragm 17, preferably in dependence on a distance value of the distance sensor 24, so that a matching diaphragm aperture still to be discussed is produced for the respective object to be detected and reads image data of the image sensor 18 to store them or to output them to an interface 40. The control and evaluation unit 38 is preferably able to localize and decode code regions in the image data so that the camera 10 becomes a camera-based code reader. A plurality of modules can be provided for the different control and evaluation work, for example to perform the diaphragm adaptations in a separate module or to perform pre-processing of the image data on a separate FPGA.

The camera 10 is protected by a housing 42 that is terminated by a front screen 44 in the front region where the received light 12 is incident.

FIG. 2 shows a possible use of the camera 10 in an installation at a conveyor belt 46. The camera 10 is shown here only as a symbol and no longer with its structure already explained with reference to FIG. 1. The conveyor belt 46 conveys objects 48, as indicated by the arrow 50, through the detection region 14 of the camera 10. The objects 48 can bear code regions 52 at their outer surfaces. It is the object of the camera 10 to detect properties of the objects 48 and, in a preferred use as a code reader, to recognize the code regions 52, to read and decode the codes affixed there, and to associate them with the respective associated object 48. In order in particular also to detect laterally applied code regions 54, additional cameras 10, not shown, are preferably used from different perspectives. In addition, a plurality of cameras 10 can be arranged next to one another or together cover a wider detection zone 14.

FIG. 3 again shows a camera 10 having a downwardly directed detection zone 14 as in the situation of FIG. 2. A distance measurement field of view 56 of the distance sensor 24 is larger than the detection zone 14 in this example and includes it. Deviating, overlapping and non-overlapping configurations of the detection zone 14 and the distance measurement field of view 56 are, however, also conceivable. A distance measurement field of view 56 disposed at least partly upstream has the advantage that a distance measurement value is available earlier.

A first object 48 to be recorded moves at a velocity v into the detection zone 14. The velocity v as a parameter known to a conveying device can be measured by an external sensor such as an encoder, can be reconstructed from earlier image recordings, or can be determined by the distance sensor 24. In the latter case, the distance sensor 24 preferably has a plurality of reception zones of light reception elements 30a into which the object 48 successively enters so that a conclusion can be drawn on the velocity v from the temporal sequence and the measured distances.

The object 48 is detected on entry into the distance measurement field of view 56. The recording should preferably be triggered when it is located at the center of the detection zone 14. The path $d_1$ has to be covered for this purpose and the time up to this point is given by $t_1=d_1/v$. The path $d_1$ also depends on the distance $h_1$ since objects 48 of different heights are detected for the first time at different positions. The distance $h_1$ is in turn measured by the distance sensor 24 and itself has to be converted from the distance value $h_{m1}$ measured obliquely instead of perpendicular by means of $h_1=h_{m1} \cos \alpha$. Under the assumption that $h_{m1}$ is measured immediately on entry into the distance measurement field of view 56, the angle $\alpha$ in the configuration shown corresponds to half the viewing angle of the distance sensor 24 and is at least known from the fixed configuration. $d_1=h_1 \tan \alpha$ can now also be calculated using these values.

Comparable considerations can be made for the further objects, with only one further object 48a of a height $h_2$ having a path $d_2$ still to be covered being shown as representative. The control and evaluation unit 38 thus has relevant geometrical information and trigger points in time that can be seen from FIG. 3. The diaphragm aperture of the adjustable diaphragm 17 can thus be set in good time for the recording of every object 48, 48a in accordance with the respective distance value of the distance sensor 24 or of the height $h_1$, $h_2$ that can be calculated therefrom.

An object 48a that is further remote from the camera 10 and thus has a smaller height $h_1 < h_2$ is perceived as darker due to the amplitude of the signal that drops quadratically with the distance. The code 52 additionally appears smaller on an object 48a having a small height $h_2$ so that a better resolution is required. A closed diaphragm expands the depth of field range and reduces the resolution. Which reduction and which signal-to-noise ratio is still tolerable depends on the specific application. This becomes clear for the example of code reading: It is ultimately not a question of whether images satisfy physical contrast criteria, but rather whether the code can be read. The matching diaphragm setting for a distance value is consequently preferably calculated from whether it is ensured that a code is legible. This can vary depending on the code type, the module size, and the decoder used so that it can be sensible to know a plurality of diaphragm settings for respective distance values in dependence on these parameters and to use them in operation in dependence on the situation.

A basis for the setting of the diaphragm can be given as follows. The resolution $\text{Res}_{img}$ correlates with the pixel size p and the magnification mag as follows:

$$\text{Res}_{img}=p/\text{mag}.$$

The magnification mag can furthermore be approximated with a known focal length f and for distances r>f as mag=$f/(f-r)$.

If the diaphragm is closed too much, diffraction effects can occur that can have an influence on the resolution. Such diffraction effects are described by the Raleigh criterion:

Res$_{diff}$=1.22*lambda/($N$*mag).

Lambda is here the wavelength; the mean value can be used with polychromatic LEDs, for example. N is the f-stop and thus inversely proportional to the diameter of the diaphragm. The factor 1.22 corresponds to a zero point position of the Bessel function and can alternatively be selected differently.

The resolution limit is then given by the maximum of the two values Res$_{img}$, Res$_{diff}$:

Res=max(Res$_{img}$, Res$_{diff}$).

The depth of field range DOF is approximated by:

$$DOF = alpha * \frac{2r^2 * N * C}{f^2}.$$

alpha is an empirical correction factor therein and C is the so-called "circle of confusion" that correlates with the resolution limit and illustratively represents the smallest unit that should still be resolved. The smaller the object to be examined, the smaller the depth of field range DOF becomes due to the linear dependency. C can now be replaced with the desired resolution limit, still corrected by an empirically determined factor α. Provided that the diaphragm is not too small and the resolutions is therefore not limited by diffraction, the replacement of C with Res results in accordance with the above equations as:

$$DOF(r) = alpha * \frac{2r^2 * N * a * p * (f-r)}{f^3} \cong alpha * \frac{2r^3 * N * a * p}{f^3}.$$

The following optimum therefore results for the diaphragm setting: If the object is small, the diaphragm should be opened. The depth of field range DOF thus becomes small. A static focal position of the reception optics 16 should therefore be designed for large distances or small objects so that the small module size can be read in a code reading application. At smaller distances or with larger objects and an unchanging focus position, the diaphragm is closed, and indeed so far until the depth of field range DOF is sufficient to be able to read the code. Thanks to the smaller distance value, the module size becomes larger in pixels so that the further closed diaphragm is tolerated.

This diaphragm adaptation is also of advantage because it partly compensates the brightness dynamics. The number of photons that reach the camera 10 depends on the diameter d of the diaphragm:

signal~$1/d^2$.

This just corresponds to the quadratic drop of the amplitude with the distance:

signal~$1/r^2$.

Due to N=$f/(d/2)$, the depth of field range DOF simultaneously grows linearly as the diaphragm becomes smaller.

A function diaphragm(distance) can be found with this knowledge with which the control and evaluation unit 38 locates the matching setting for the adjustable diaphragm 17 for the respectively measured distance value. The image is sharp due to the depth of field range that is expanded as necessary by the diaphragm with this dynamic diaphragm setting and delivers a sufficient signal so that the decoder can read the code (Good Read). It is sensible under certain circumstances to store a plurality of such functions for different scenarios with respect to code type, module size, exposure, and/or decoder and to use one of these functions in dependence on the actual conditions in the application.

A start point can first be located to teach or calibrate the required diaphragm settings or the function diaphragm(distance) in that a lowest object to be expected is positioned with a correspondingly smallest module size in the detection zone 14. This preferably corresponds to its focal position in a fixed focus system. The diaphragm is opened so far so that the code is still read and this corresponds to the value to be set for the diaphragm at this distance. The diaphragm is closed further for higher objects to compensate the blur. It is conceivable to calibrate at least one further value of the function diaphragm(distance) with the aid of an object of the corresponding height. Interpolation or extrapolation can take place from the taught diaphragm settings for different distance values or heights.

The invention claimed is:

1. A camera for the detection of objects moved through a detection zone, the camera comprising:
   an image sensor for recording image data;
   reception optics having an adjustable diaphragm, the reception optics having a fixed focal position;
   a distance sensor for measuring a distance value from an object; and
   a control and evaluation unit to read the image data and to set the diaphragm,
   wherein the control and evaluation unit is configured to set the diaphragm per object dependent on the distance value measured from the object such that the object is recorded in a required depth of field range.

2. The camera in accordance with claim 1,
   wherein the depth of field range is determined from application-specific demands.

3. The camera in accordance with claim 1,
   wherein the control and evaluation unit is configured to read a code content of a code on the object using the image data.

4. The camera in accordance with claim 3,
   wherein the object is recorded in the depth of field range when a code can be read from the recorded image data.

5. The camera in accordance with claim 3,
   wherein the required depth of field range depends on a code type, on a module size, on an exposure, and/or on a decoding process.

6. The camera in accordance with claim 1,
   wherein the distance sensor is integrated in the camera and/or is configured as an optoelectronic distance sensor in accordance with the principle of the time of flight process.

7. The camera in accordance with claim 1,
   wherein the control and evaluation unit is further configured to set the diaphragm for the object using a function of the required diaphragm in dependence on the distance of an object.

8. The camera in accordance with claim 1,
   wherein the control and evaluation unit is further configured for a teaching process in which an object is arranged at a distance, image data are recorded, an image distinction is checked, and the diaphragm is adjusted until a suitable diaphragm setting for this distance has been found.

9. The camera in accordance with claim 1, wherein the fixed focal position is fixed for a maximum object distance.

10. The camera in accordance with claim 1, wherein the control and evaluation unit is further configured to set the diaphragm to a maximum diaphragm aperture for an object at a distance corresponding to the focal position and to increasingly close the diaphragm for different distances.

11. The camera in accordance with claim 10, wherein the different distances are smaller distances.

12. The camera in accordance with claim 1, wherein the control and evaluation unit is configured to set the diaphragm in dependence on a brightness.

13. The camera in accordance with claim 12, wherein the diaphragm is set in dependence on a brightness of the image data.

14. The camera in accordance with claim 1, wherein the diaphragm is installed in the reception optics or is placed onto the reception optics.

15. The camera in accordance with claim 1, that is installed in a stationary manner at a conveying device that guides objects to be detected in a direction of conveying through the detection zone.

16. A method of detecting objects moved through a detection zone comprising:
    recording image data with an image sensor through reception optics having an adjustable diaphragm, wherein the reception optics have a fixed focal position;
    reading the image data;
    measuring a distance value from an object; and
    setting the diaphragm per object dependent on the distance value measured from the object such that the object is recorded in a required depth of field range.

17. A camera for the detection of objects moved through a detection zone, the camera comprising:
    an image sensor for recording image data;
    reception optics having an adjustable diaphragm;
    a distance sensor measuring a distance value from an object; and
    a control and evaluation unit to read the image data and to set the diaphragm,
    wherein the control and evaluation unit is configured to set the diaphragm per object such that the object is recorded in a depth of field range, and
    wherein the control and evaluation unit is further configured for a teaching process in which an object is arranged at a distance, image data are recorded, an image distinction is checked, and the diaphragm is adjusted until a suitable diaphragm setting for this distance has been found.

* * * * *